Dec. 3, 1940.     R. M. OWEN     2,223,528

CREAM SEPARATOR

Filed Feb. 28, 1940

INVENTOR.
Raymond M. Owen,
BY
Philip S. McLean
ATTORNEY.

Patented Dec. 3, 1940

2,223,528

UNITED STATES PATENT OFFICE 2,223,528

CREAM SEPARATOR

Raymond M. Owen, New York, N. Y.

Application February 28, 1940, Serial No. 321,155

1 Claim. (Cl. 137—20)

The present invention relates to the separation and removal of the cream from the tops of milk bottles.

Milk containers of the waxed paper type present a particular problem in respect to removal of the cream, in that the relatively small pouring opening in the top restricts the flow and causes the cream to mix with the milk as the pouring progresses and the opaque character of the container prevents this action being observed and the pouring controlled accordingly.

Special objects of this invention are to accomplish the separation and removal of the cream from these containers of the waxed paper type and to provide simple, inexpensive and practical means for the purpose.

The foregoing and other desirable objects are attained in the present invention by the novel features hereinafter disclosed, broadly covered in the claim and illustrated in the accompanying drawing.

One of the practical embodiments of the invention is illustrated in the accompanying drawing, but it is to be understood that various structural changes and modifications may be made all within the true spirit of the invention as hereinafter defined and broadly covered in the claim.

Figure 1:
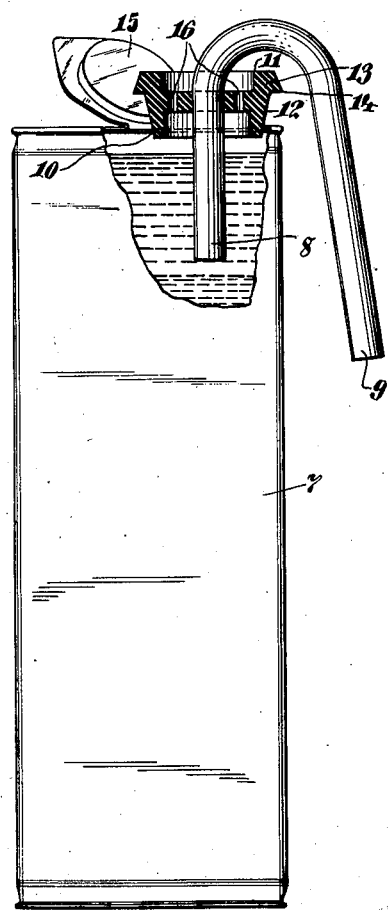
Fig. 1 is a broken part sectional side elevation showing the cream separator as applied and ready for use with a waxed paper milk container.
Figure 2:
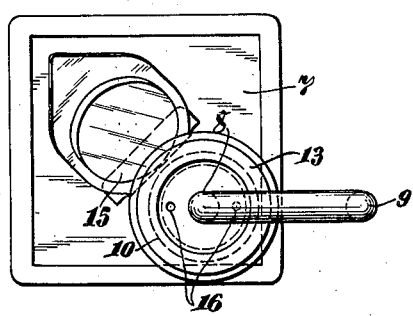
Fig. 2 is a plan view of the same.

In the several views, a milk container of the waxed paper type is indicated at 7. The walls of these containers are more or less flexible and compressible and this distinguishing characteristic is utilized in the present invention to accomplish a displacement action which will start a siphon for withdrawing the cream layer.

The siphon is shown as a bent tube having a short leg 8, to extend down into the container to approximately the lower cream level and a long leg 9, to extend down over the side of the container.

To fit this siphon to the pouring opening 10, in the top of the container, a stopper 11, is provided. This is shown as a plug of rubber or other material suited to close the pouring opening with a sufficient sealing effect.

In the illustration, the stopper is shown as double ended, having one taper 12, to fit the pouring opening in quart size containers and a larger reversely facing taper 13, at the opposite end to fit the pouring opening in the larger two quart size containers. This particular stopper is removably engaged over the short leg of the siphon tube and so may be readily reversed to fit either the smaller or the larger size containers.

The smaller tapered portion of the plug is shown as of sufficient length to support the intermediate shoulder 14, at the juncture of the smaller with the larger diameter portion of the plug at a point above and clear of the normal closure 15, after it has been lifted and turned back over the top of the container.

To enable the displacement action necessary to start the siphon flow, the container should be sealed or nearly so, but at the same time, an inflow of air should be provided for, the instant the siphon starts. This is accomplished in the present disclosure by providing one or more vents, sufficiently restricted to hold the air as a cushion in the top of the container when the sides of the container are squeezed, but sufficient in extent to admit an inflow of air, capable of maintaining the siphon flow. In the present illustration, restricted air flow is provided for by small air passages 16, through the stopper at the sides of the short leg of the siphon.

In Fig. 1, the container is shown as having the cover 15, which normally seals the container partially removed and thrown back clear of the pouring opening and the siphon as seated in the pouring opening with the stopper portion substantially sealing said opening.

Figure 3:
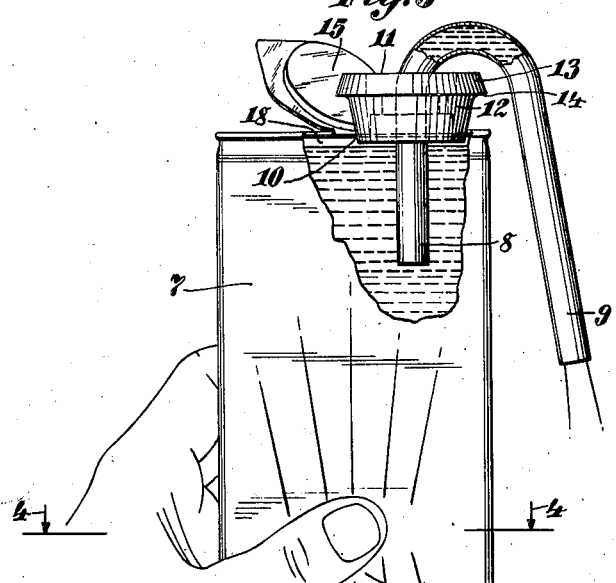
Fig. 3 is a view similar to Fig. 1, illustrating the operation of compressing the side walls of the container to start the siphon action.
Figure 4:
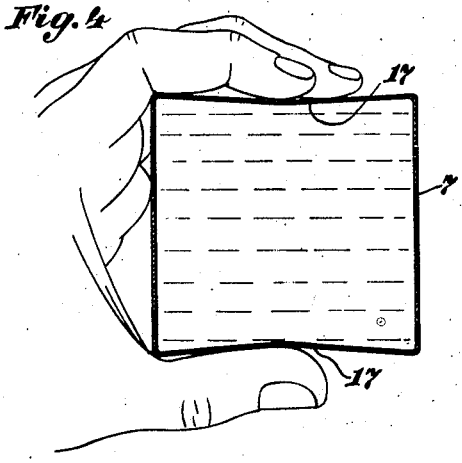
Fig. 4 is a cross-sectional view as on line 4—4 of Fig. 3, to illustrate the displacement action achieved by squeezing the sides of the container.

Figs 3 and 4 show how then if the opposite sides of the container are squeezed toward each other as at 17, by the fingers of one hand, the air cushion trapped in the top of the container at 18, above the liquid, will react as a gaseous piston to start the flow up through the siphon. As soon as such flow starts, the pressure of the fingers may be released and such flow will continue until the foot of the short leg is uncovered, the vents admitting sufficient air for the siphon flow to continue to the end of such decanting.

While shown as made in two parts, it is contemplated that the siphon and stopper may be made all in one piece, for instance, by being molded so in one of the plastics now on the market. In such case, reversibility may be provided for by molding two siphons, in reversed relation associated respectively with stopper portions of the lesser and greater diameters to fit the one quart and the two quart size containers.

What is claimed is:

In a cream separator for packaged milk, a container having a fixed top wall with a filling opening therein, said container having flexible opposite side walls displaceable inward in the grasp of the fingers to effect lifting of the body of liquid in the container, a tapered rigid plug seated in fixed relation in said opening in the top of the container, a siphon tube carried by said plug and having a short leg extending down into said container to the level determined by the fixed position of said plug in the top of the container and a long leg extending down over the side of the container, said plug having a continuously open vent of sufficient size to enable atmospheric pressure to maintain siphon flow once started, but so restricted as to hold a cushion of air trapped in the top of the container above the liquid when the flexible sides are squeezed toward each other, to thereby cause liquid forced upward by inward displacement of the flexible sides to rise to the top of the siphon tube and said air cushion to continue application of force for maintaining flow as pressure of the fingers displacing the flexible sides inwardly is released and whereby the siphonic flow can be initiated and kept in continued operation by simply applying finger pressure to the opposite flexible side walls and then releasing such pressure when the flow starts.

RAYMOND M. OWEN.